United States Patent
Saisho et al.

(10) Patent No.: US 7,417,777 B2
(45) Date of Patent: Aug. 26, 2008

(54) OPTICAL SCANNING DEVICE AND IMAGE FORMING APPARATUS

(75) Inventors: Kenichiroh Saisho, Kanagawa (JP); Yoshinori Hayashi, Kanagawa (JP); Takeshi Ueda, Tokyo (JP); Kohji Sakai, Tokyo (JP); Daisuke Ichii, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 11/844,643

(22) Filed: Aug. 24, 2007

(65) Prior Publication Data

US 2008/0055692 A1    Mar. 6, 2008

(30) Foreign Application Priority Data

Sep. 4, 2006    (JP) .............................. 2006-239564

(51) Int. Cl.
G02B 26/08    (2006.01)

(52) U.S. Cl. ........................ 359/196; 359/204; 359/212; 347/259

(58) Field of Classification Search ........................ None
See application file for complete search history.

(56) References Cited

U.S. PATENT DOCUMENTS

| | | | |
|---|---|---|---|
| 6,462,853 B2 | 10/2002 | Hayashi | |
| 6,563,624 B1 * | 5/2003 | Ishihara | ...................... 359/205 |
| 6,788,444 B2 | 9/2004 | Suzuki et al. | |
| 6,815,663 B2 | 11/2004 | Ueda | |
| 6,816,293 B2 * | 11/2004 | Kato | ........................... 359/207 |
| 7,068,296 B2 | 6/2006 | Hayashi et al. | |
| 7,106,483 B2 | 9/2006 | Hayashi et al. | |
| 7,164,516 B2 | 1/2007 | Hayashi et al. | |
| 7,218,432 B2 | 5/2007 | Ichii et al. | |
| 7,253,937 B2 | 8/2007 | Ueda et al. | |
| 2003/0067533 A1 | 4/2003 | Omori et al. | |
| 2005/0093955 A1 | 5/2005 | Izumi et al. | |
| 2005/0179771 A1 | 8/2005 | Ueda | |
| 2006/0077500 A1 | 4/2006 | Hayashi et al. | |

(Continued)

FOREIGN PATENT DOCUMENTS

JP        11-223783        8/1999

(Continued)

OTHER PUBLICATIONS

U.S. Appl. No. 11/873,635, filed Oct. 17, 2007, Hayashi et al.

(Continued)

*Primary Examiner*—James Phan
(74) *Attorney, Agent, or Firm*—Oblon, Spivak, McClelland, Maier & Neustadt, P.C.

(57) ABSTRACT

A coupling lens arranged on an optical path of an optical beam from a VCSEL, which has a refraction plane and a diffraction plane that respectively change a power according to a temperature change and suppresses a beam-waist position change in a main-scanning direction and a sub-scanning directions on the scanning surface caused by the temperature change, by a wavelength change of the optical beam caused by power changes of the refraction plane and the diffraction plane and the temperature change. A deflecting unit deflects the optical beam that passed through the coupling lens. A scanning optical system condenses a deflected optical beam on the scanning surface.

11 Claims, 10 Drawing Sheets

U.S. PATENT DOCUMENTS

| | | |
|---|---|---|
| 2006/0187294 A1 | 8/2006 | Saisho et al. |
| 2006/0232659 A1 | 10/2006 | Hayashi et al. |
| 2006/0245009 A1 | 11/2006 | Akiyama et al. |
| 2006/0284968 A1 | 12/2006 | Hayashi et al. |
| 2007/0035796 A1* | 2/2007 | Nakajima .................. 359/204 |
| 2007/0058255 A1 | 3/2007 | Imai et al. |
| 2007/0081217 A1 | 4/2007 | Hayashi et al. |

FOREIGN PATENT DOCUMENTS

| | | |
|---|---|---|
| JP | 2002-214556 | 7/2002 |
| JP | 2003-337295 | 11/2003 |
| JP | 2004-126192 | 4/2004 |
| JP | 2005-215188 | 8/2005 |

OTHER PUBLICATIONS

U.S. Appl. No. 11/877,020, filed Oct. 23, 2007, Hayashi et al.

* cited by examiner

FIRST PLANE  SECOND PLANE  DIFFRACTION PLANE

OPTICAL SCANNING DEVICE AND IMAGE FORMING APPARATUS

CROSS-REFERENCE TO RELATED APPLICATIONS

The present application claims priority to and incorporates by reference the entire contents of Japanese priority document, 2006-239564 filed in Japan on Sep. 4, 2006.

BACKGROUND OF THE INVENTION

1. Field of the Invention

The present invention relates to an optical scanning device and an image forming apparatus, and, more particularly to an optical scanning device that scans a scanning surface by beams from a light source, and to an image forming apparatus including the optical scanning device.

2. Description of the Related Art

Recently, high stability relative to temperature change, high definition (high image quality), and high speed as well as cost reduction are required for image forming apparatuses such as an optical printer, a digital copying machine, and an optical plotter. These image forming apparatuses generally include an optical scanning device that scans a scanning surface by beams from a light source.

For high definition and high speed of an image forming apparatus, a method of using a plurality of beams has been used. To obtain a plurality of beams, there are two methods: (1) a method of combining a plurality of end-face emitting semiconductor lasers; and (2) a method of using an end-face emitting laser array in which a plurality of light emitting units is formed on one substrate. However, in the method (1), there are problems in that because the elements are mounted in a plurality of numbers, a light source unit becomes complicated, the number of parts increases and complicated adjustment is required. In the method (2), there is a problem that there is a difference in wavelength between the light emitting units, and individual adjustment is not possible.

A light source using a vertical-cavity surface-emitting laser (VCSEL) has been recently proposed. This type of light source can easily form several tens of light emitting units two-dimensionally on one element. Further, because light emission due to stable laser oscillation is performed by a single longitudinal mode oscillation in each light emitting unit, a difference in the wavelength between respective light emitting units is quite small.

As a representative method of achieving cost reduction of the image forming apparatus, there is a method of resinifying optical elements used for the optical scanning device. For example, if various lenses are formed of a resin material, there are merits that (1) lightening is possible, (2) low-cost molding is possible, and (3) formation of a surface having a special shape (hereinafter, also "special surface" for convenience) is facilitated. Particularly, if a resin lens having the special surface is employed, optical characteristic of the lens can be improved. As one of the special surfaces, there is a diffraction plane having a shape obtained by folding a shape of a refraction plane at an appropriate pitch. The diffraction plane can add a power higher than that of the refraction plane to the lens, thereby enabling a reduction of the number of the lenses constituting an optical system of the optical scanning device.

To realize the image forming apparatus highly stable relative to a temperature change, in the optical scanning device, (A) a method of correcting degradation of the optical characteristics due to the temperature change by combining a plurality of lenses having an opposite power to each other, and (B) a method of correcting degradation of the optical characteristics due to the temperature change by using negative dispersion of the diffraction plane have been proposed (for example, see Japanese Patent Application Laid-open Nos. 2004-126192, 2003-337295, H11-223783, 2002-214556, and 2005-215188). Particularly, along with sophistication of a forming technique of the resin material, the method of using the diffraction plane is effective for realizing the optical scanning device highly stable relative to a temperature change, with a small number of parts and low cost.

However, because the diffraction plane is very sensitive to a difference in wavelength of incident beams, there is the possibility that significant performance degradation of the optical system can occur according to magnification of the optical system and a difference in wavelength of the light source. In the method (B), therefore, the shape of the diffraction plane needs to be designed so that a power change of the diffraction plane due to wavelength variation of the light source cancels the performance degradation of the optical system. In other words, the shape of the diffraction plane needs to be designed corresponding to the optical system, and therefore generality of the lens having the diffraction plane formed thereon decreases, thereby leading to cost increase.

SUMMARY OF THE INVENTION

It is an object of the present invention to at least partially solve the problems in the conventional technology.

An optical scanning device according to one aspect of the present invention scans a scanning surface using an optical beam. the optical scanning device includes a vertical-cavity surface-emitting laser that emits the optical beam; a coupling lens arranged on an optical path of the optical beam from the vertical-cavity surface-emitting laser, the coupling lens having a refraction plane and a diffraction plane that respectively change a power according to a temperature change and suppressing a beam-waist position change in a main-scanning direction and a sub-scanning directions on the scanning surface caused by the temperature change, by a wavelength change of the optical beam caused by power changes of the refraction plane and the diffraction plane and the temperature change; a deflecting unit that deflects the optical beam that passed through the coupling lens; and a scanning optical system that condenses a deflected optical beam on the scanning surface.

An image forming apparatus according to another aspect of the present invention includes at least one image carrier; and an optical scanning device that scans a scanning surface using an optical beam, which includes a vertical-cavity surface-emitting laser that emits the optical beam, a coupling lens arranged on an optical path of the optical beam from the vertical-cavity surface-emitting laser, the coupling lens having a refraction plane and a diffraction plane that respectively change a power according to a temperature change and suppressing a beam-waist position change in a main-scanning direction and a sub-scanning directions on the scanning surface caused by the temperature change, by a wavelength change of the optical beam caused by power changes of the refraction plane and the diffraction plane and the temperature change; a deflecting unit that deflects the optical beam that passed through the coupling lens; and a scanning optical system that condenses a deflected optical beam on the scanning surface. The scanning optical system scans the optical beam including image information to the at least one image carrier.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 1:
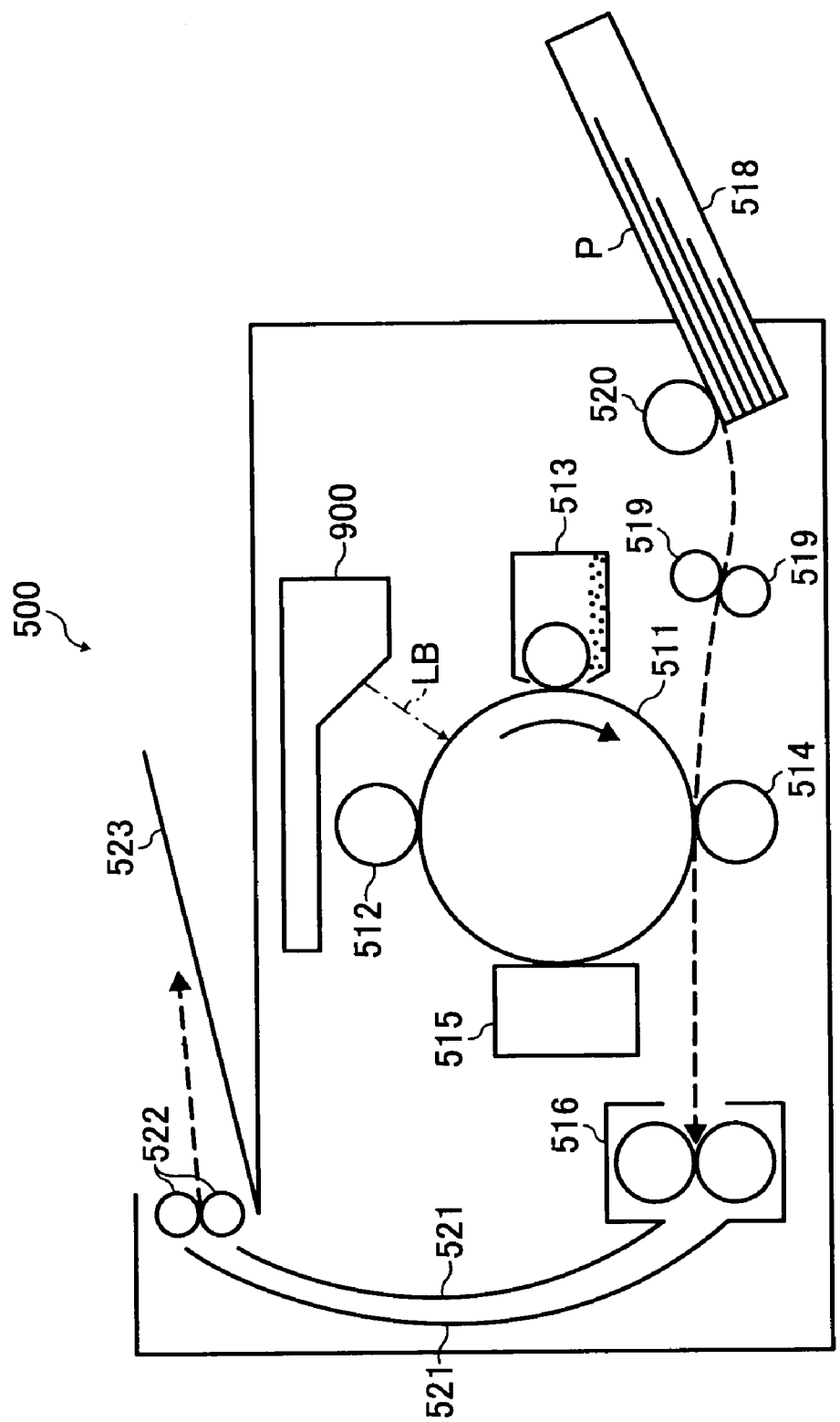
FIG. 1 is a schematic diagram for explaining a configuration of a laser printer according to an embodiment of the present invention.

Exemplary embodiments of the present invention are explained in detail below with reference to the accompanying drawings. FIG. 1 is a schematic diagram for explaining a configuration of a laser printer 500 as an image forming apparatus according to an embodiment of the present invention.

The laser printer 500 includes a photoconductive drum 511, a charging roller 512, a developing unit 513, a transfer roller 514, a cleaning unit 515, a fuser 516, an optical scanning device 900, a cartridge 518, a registration roller pair 519, a paper feed roller 520, a pair of paper ejection rollers 522, and a tray 523.

The charging roller 512, the developing unit 513, the transfer roller 514, and the cleaning unit 515 are respectively arranged near the surface of the photoconductive drum 511. These units are arranged along the rotation direction of the photoconductive drum 511 (a direction of arrow in FIG. 1) in an order of the charging roller 512, the developing unit 513, the transfer roller 514, and the cleaning unit 515.

The photoconductive drum 511 is an image carrier, and a photosensitive layer having photoconductivity is formed on the surface thereof.

The charging roller 512 is a charging unit that uniformly charges the surface of the photoconductive drum 511. As the charging unit, a corona charger can be used.

The optical scanning device 900 scans the surface of the photoconductive drum 511 charged by the charging roller 512 with beams LB modulated based on image information from a high-order apparatus (for example, a personal computer). Due to the optical scanning by the optical scanning device 900, electric charges disappear only in a part irradiated with the beams on the surface of the photoconductive drum 511, to form a latent image (electrostatic latent image) corresponding to the image information on the surface of the photoconductive drum 511. The latent image formed here is a so-called negative latent image, and moves in a direction toward the developing unit 513 with the rotation of the photoconductive drum 511. A longitudinal direction of the photoconductive drum 511 (a direction along an axis of rotation) is referred to as a "main-scanning direction", and a rotation direction of the photoconductive drum 511 is referred to as a "sub-scanning direction". The configuration of the optical scanning device 900 will be described later.

The developing unit 513 includes a toner cartridge in which a toner is stored, so that the toner is stuck only on the part irradiated with the beams on the surface of the photoconductive drum 511. In other words, the developing unit 513 allows the toner to adhere on the latent image formed on the surface of the photoconductive drum 511, thereby manifesting an image of the image information. The latent image on which the toner has adhered (hereinafter, also "toner image" for convenience) moves in the direction toward the transfer roller 514 with the rotation of the photoconductive drum 511.

The cartridge 518 is detachable from the body of the laser printer 500, and transfer paper P as a transfer object is stored therein. The paper feed roller 520 is arranged near the cartridge 518, and the paper feed roller 520 takes out the uppermost one sheet of the transfer paper P stored in the cartridge 518.

The registration roller pair 519 is arranged near the transfer roller 514, to catch an end of the transfer paper taken out by the paper feed roller 520. The registration roller pair 519 then feeds the transfer paper to a gap between the transfer roller 514 and the photoconductive drum 511, with timing adjusted with a shift of the toner image on the photoconductive drum 511 to a transfer position. The fed transfer paper is overlapped on the toner image by the transfer roller 514, and the toner image is electrostatically transferred.

The transfer paper onto which the toner image has been transferred is fed to the fuser 516, and the toner image is fixed by the fuser 516. The transfer paper is then ejected onto the tray 523 by the paper ejection rollers 522, via a carrier path 521.

The surface of the photoconductive drum 511 after the toner image is transferred is cleaned by the cleaning unit 515, to remove residual toner and paper dust.

Figure 2:
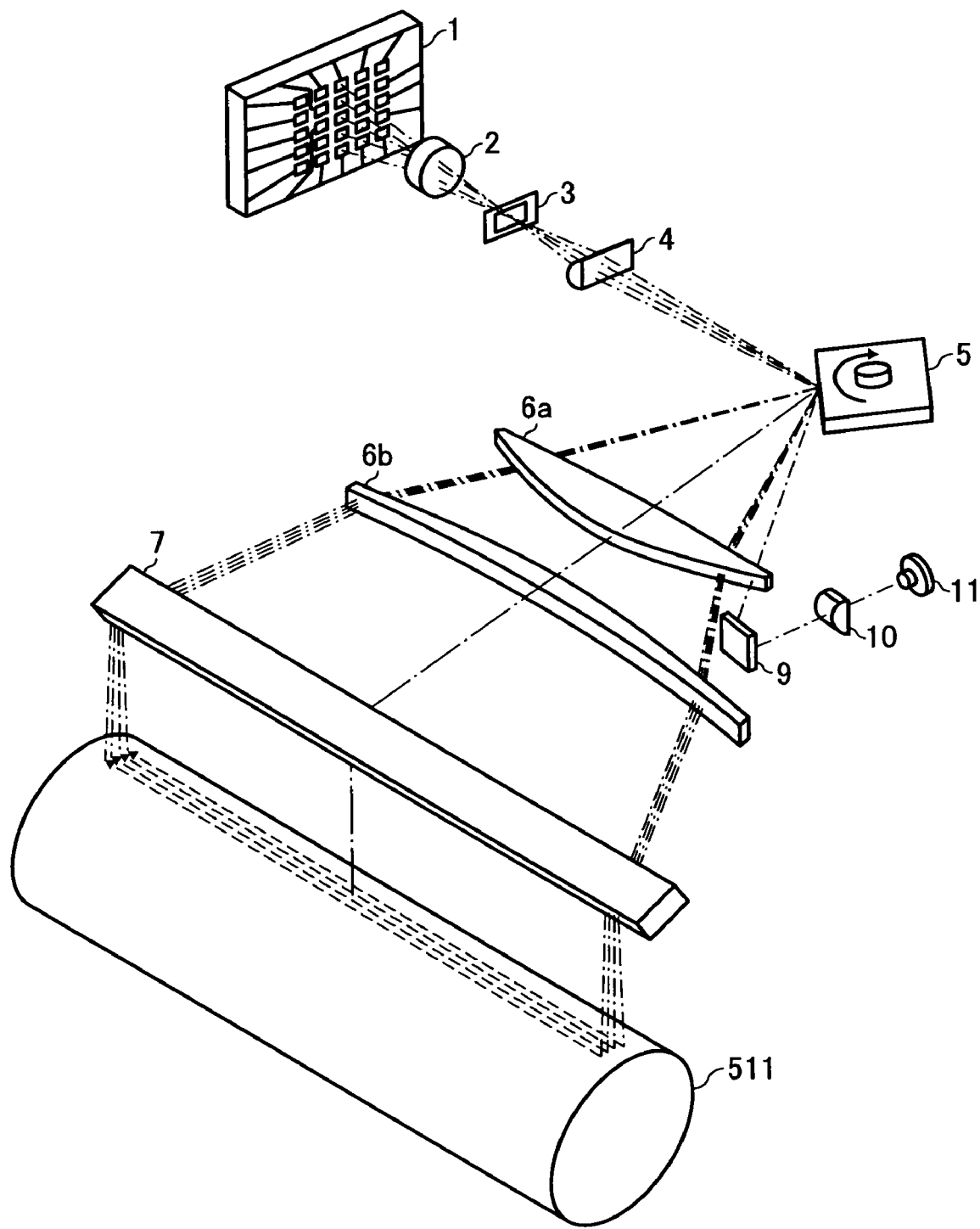
FIG. 2 is a perspective view of a schematic configuration of an optical scanning device in FIG. 1.

The configuration of the optical scanning device 900 is explained with reference to FIG. 2.

The optical scanning device 900 includes a vertical-cavity surface-emitting laser 1, a coupling lens 2, an aperture 3, a line-image forming lens 4, a polygon mirror 5 as a deflecting unit, two scanning lenses (6a, 6b), a folding mirror 7, a synchronizing mirror 9, a synchronizing lens 10, and a synchronization detector 11.

The vertical-cavity surface-emitting laser 1 includes a plurality of light emitting units having an emission wavelength of 780 nanometers in design. As an example, the vertical-cavity surface-emitting laser 1 has a characteristic such that when temperature increases by 1° C. relative to a standard temperature (25° C.), the emission wavelength shifts to a long wavelength side by 0.062 nanometer.

The coupling lens 2 is a resin lens having a focal length of 45 millimeters, and changes the beams emitted from the vertical-cavity surface-emitting laser 1 substantially to parallel beams. The resin as the material of the coupling lens 2 has physical properties such that a refractive index at the standard temperature relative to the beams of 780 nanometers is 1.523961, a refractive index when the temperature rises by 20° C. from the standard temperature is 1.522188, and a coefficient of linear expansion is $7.0 \times 10^{-5}$/K.

Figure 3:
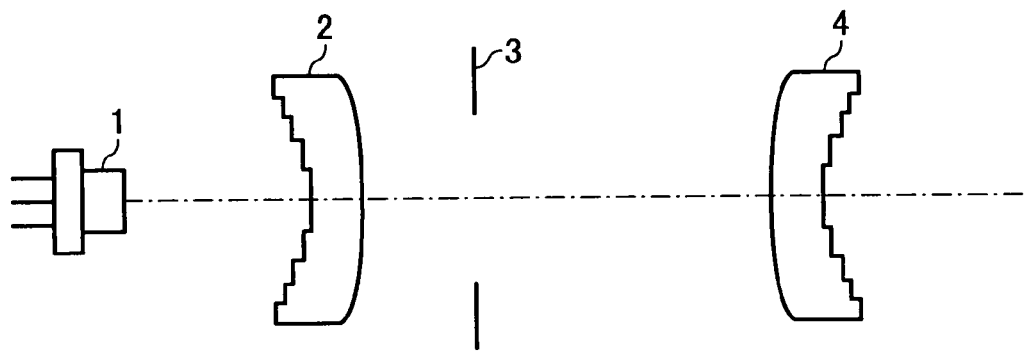
FIG. 3 is a schematic diagram for explaining a coupling lens and a line-image forming lens in FIG. 2.

As shown in FIG. 3 as one example, a refraction plane is used for an emission plane of the coupling lens 2. As one example, the refraction plane has a rotationally symmetric spherical coefficient with a radius of curvature being 24.77 millimeters.

Figure 4:
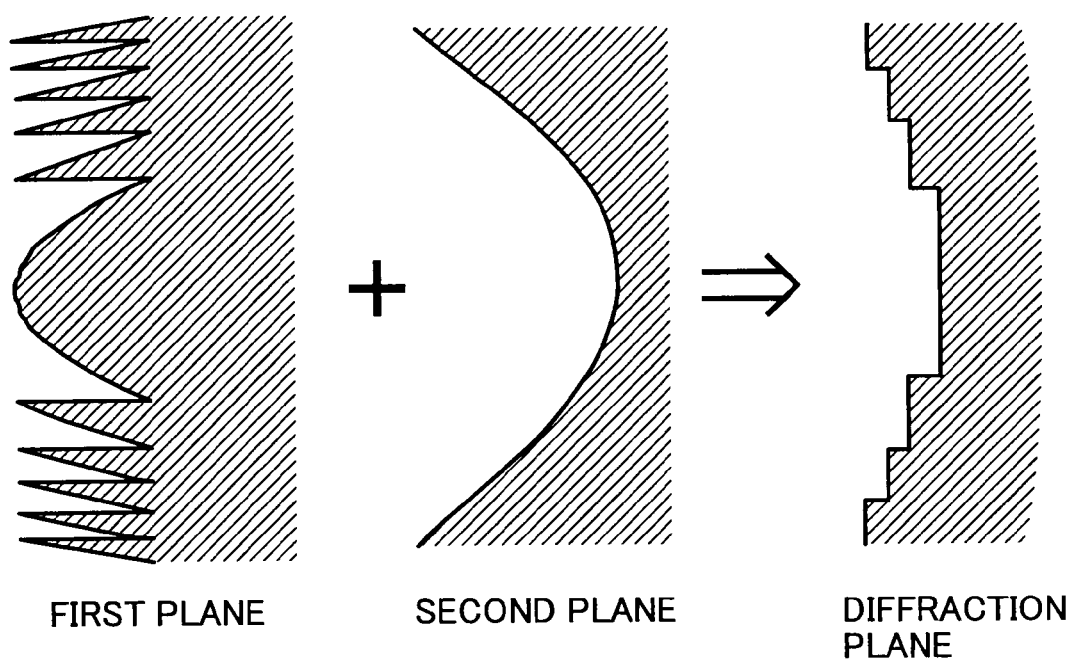
FIG. 4 is a schematic diagram (1) for explaining a diffraction plane.

As shown in FIG. 3 as one example, in the coupling lens 2, a diffraction plane is used for an incident plane. The diffraction plane is a plane obtained, as shown in FIG. 4 as one example, by combining a plane having a diffraction effect (hereinafter, also "first plane" for convenience) with a plane having a refraction effect (hereinafter, also "second plane" for convenience). It is set such that the power of the first plane and the power of the second plane are cancelled by each other. Accordingly, the diffraction plane of the coupling lens 2 has no power both in the main-scanning direction and the sub-scanning direction.

When it is assumed that a distance from an optical axis on a surface vertical to the optical axis is R, a phase function $\phi(R)$ of the first plane is represented by the following equation (1). A point on the optical axis is designated as R=0.

$$\phi(R) = C \cdot R^2 \tag{1}$$

Figure 5:
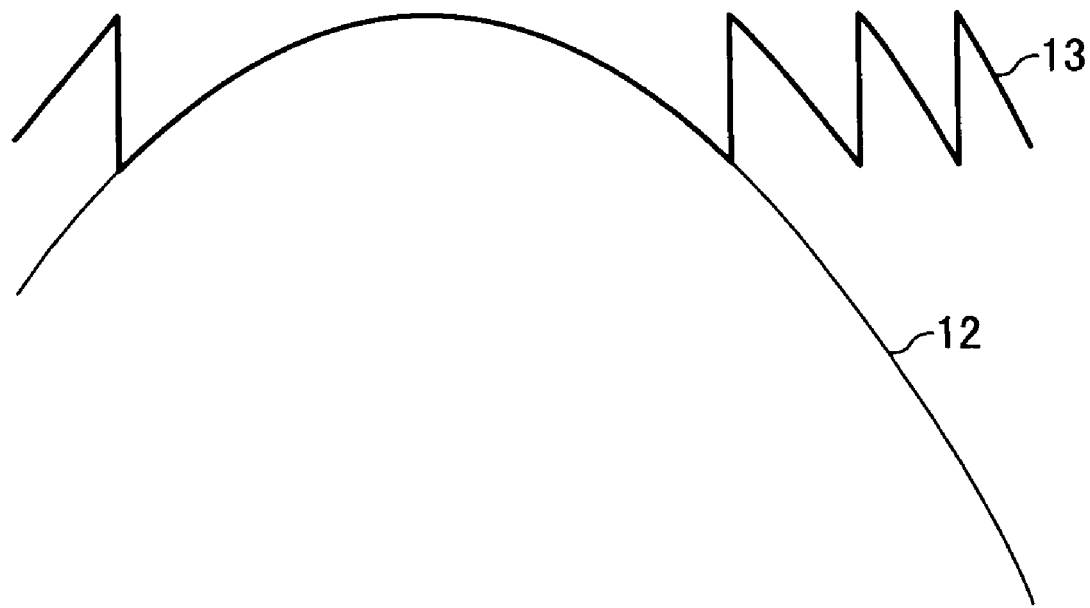
FIG. 5 is a schematic diagram (2) for explaining a diffraction plane.

As one example, C in equation (1) is −0.015594077. In this case, as shown in FIG. 5 as one example, the first plane 13 is formed on a paraboloid expressed as $y = 0.029761905 \times r^2$, where y denotes a depth in a direction of optical axis, and r denotes a distance from the optical axis (lens height).

As one example, the radius of curvature of the second plane is 16.8 millimeters.

A plurality of diffraction grooves on the diffraction plane of the coupling lens 2 is concentric circular, centering on the optical axis, and stepwise (see FIG. 3). That is, diffraction grooves are formed multi-stepwise on the diffraction plane of the coupling lens 2.

Specifically, a difference in level in the multi-step shape is 1.489 micrometers, a minimum pitch (the outermost zone) is 8.347 micrometers, and number of steps is 179 steps.

If the diffraction plane has a shape obtained by folding a surface shape of the refraction plane with appropriate difference and pitch, the pitch gradually decreases toward a peripheral part of the lens. Accordingly, production of a mold for forming the diffraction plane becomes difficult. However, if the diffraction plane is formed by combining the first plane and the second plane having opposite power to each other, a folded part on the diffraction plane becomes an obtuse angle, which is advantageous in production of the mold. Particularly, as in the present embodiment, when the surface shape of the diffraction plane is a multi-step shape, the angle of the folded part becomes a right angle, which is a stepwise shape symmetrical to the optical axis, thereby further improving the convenience in production of the mold.

As one example, the power of the refraction plane (emission plane) at the standard temperature is $-8.39 \times 10^{-3}$ (mm$^{-1}$), the power of the diffraction plane (incident plane) at the standard temperature is $3.12 \times 10^{-2}$ (mm$^{-1}$), a power change of the refraction plane per unit wavelength is $1.05 \times 10^{-6}$ (mm$^{-1}$), and a power change of the diffraction plane per unit wavelength is $4.46 \times 10^{-6}$ (mm$^{-1}$). That is, the power change of the refraction plane per unit wavelength is smaller than that of the diffraction plane per unit wavelength.

Figure 6A:
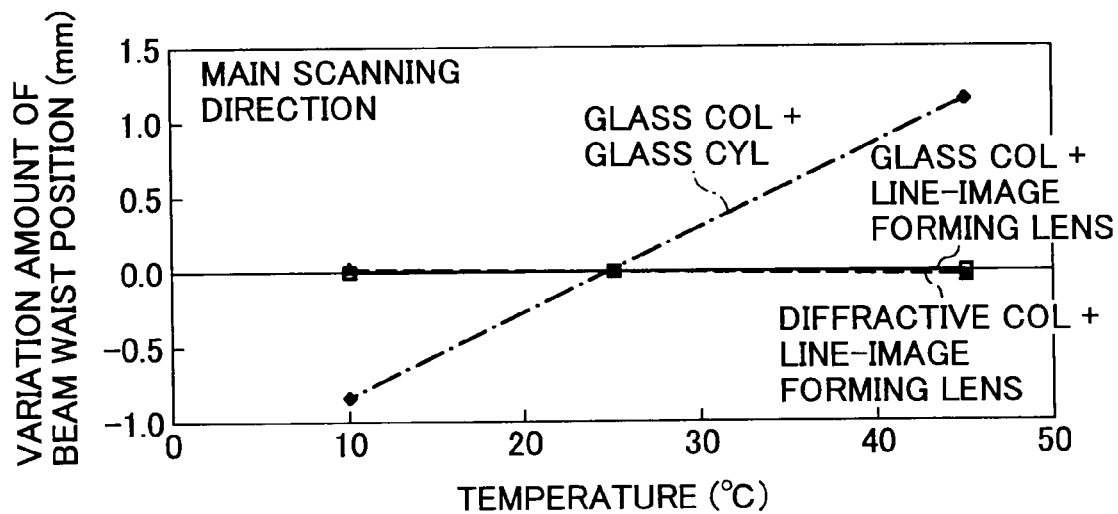
FIG. 6A and FIG. 6B are schematic diagrams for explaining a relationship between a variation amount of a beam waist position and temperature.
Figure 6B:
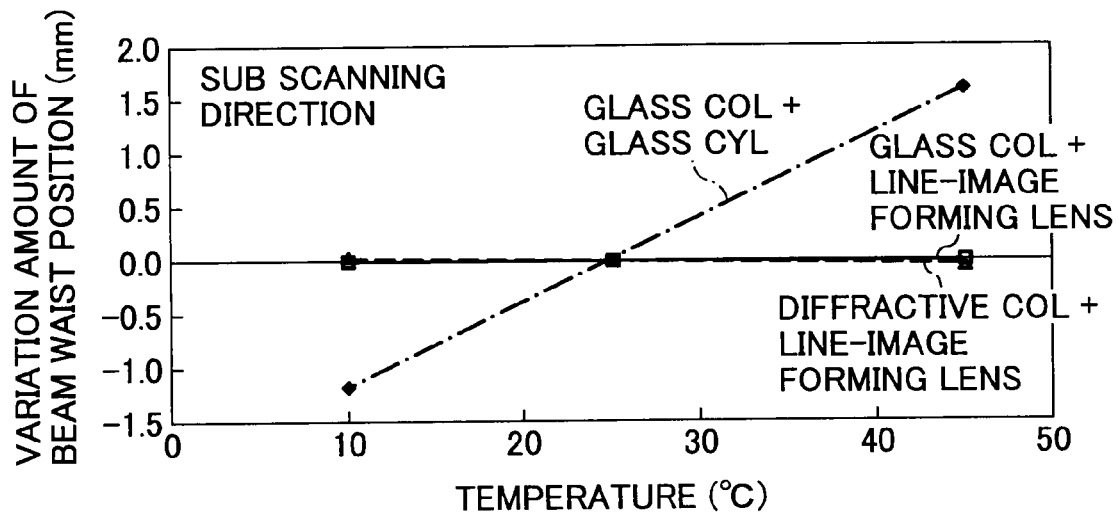

As shown in FIGS. 6A and 6B as one example, the coupling lens 2 is so set as to suppress a change in the beam waist position in the main and sub-scanning directions on the surface of the photoconductive drum 511 due to the temperature change, by a wavelength change of the beams from the vertical-cavity surface-emitting laser 1 resulting from the power change of the refraction plane and the diffraction plane and the temperature change. A diffractive COL in FIGS. 6A and 6B is a so-called self-proving coupling lens designed to cancel only a temperature change occurring at the time of changing the material of the coupling lens from glass to resin by the diffraction plane of the own lens. A variation amount of the beam waist position in a combination of "diffractive COL+ line-image forming lens" is substantially zero, as in a combination of "glass COL (glass coupling lens)+line-image forming lens". "Glass CYL" in FIGS. 6A and 6B stands for a glass cylindrical lens. In a combination of "glass COL+glass CYL", the variation amount of the beam waist position largely differs according to the temperature.

The vertical-cavity surface-emitting laser 1 and the coupling lens 2 are held by a holding member (not shown) formed of a material having a coefficient of linear expansion of $2.3 \times 10^{-5}$/K.

The aperture 3 has a rectangular opening having a width of 6.4 millimeters in a direction corresponding to the main-scanning direction and a width of 1.18 millimeters in a direction corresponding to the sub-scanning direction, as one example, and shapes the beams via the coupling lens 2 to determine a beam spot diameter on the photoconductive drum 511.

In this specification, the "beam spot diameter" is defined by using a line spread function in light intensity distribution of the beam spot. When a center of the beam spot is designated as a reference, and it is assumed that the light intensity distribution of the beam spot in Y coordinate in the main-scanning direction and Z coordinate in the sub-scanning direction is f(Y, Z), the line spread function LSZ (Z) in the sub-scanning direction is expressed by the following equation (2). Integration is performed relative to the whole width of the beam spot in the main-scanning direction.

[Equation 1]

$$LSZ(Z) = \int f(Y,Z) dY \tag{2}$$

The line spread function LSY (Y) in the main-scanning direction is expressed by the following equation (3). Integration is performed relative to the whole width of the beam spot in the sub-scanning direction.

[Equation 2]

$$LSY(Y) = \int f(Y,Z) dZ \tag{3}$$

The line spread function LSZ (Z) and the line spread function LSZ (Y) have generally a substantially Gaussian distribution shape, and the beam spot diameter in the main and sub-scanning directions are provided in widths in the main and sub-scanning directions of a region in which these line spread functions are equal to or larger than $1/e^2$ of the maximum value thereof.

The beam spot diameter defined as described above by the line spread functions can be easily measured by optically scanning a beam spot by a slit at a uniform velocity, receiving light having passed through the slit by an optical detector, and integrating the received light amount, and an apparatus for performing such measurement has already been commercially available.

The line-image forming lens 4 images the beams having passed through the opening of the aperture 3 near a deflection reflecting surface of the polygon mirror 5 relative to the sub-scanning direction.

The incident plane of the line-image forming lens 4 is an anamorphic plane having a radius of curvature of 512 millimeters in a direction corresponding to the main-scanning direction and a radius of curvature of 56.4 millimeters in a direction corresponding to the sub-scanning direction.

A plurality of diffraction grooves are formed stepwise in a concentric elliptic shape on the emission plane of the line-image forming lens 4. That is, the diffraction plane of the line-image forming lens 4 is formed multi-stepwise. A phase function φ(Y, Z) of the diffraction plane is represented by the following equation (4). As one example, C1 is −0.001999851, and C2 is −0.014084973. The diffraction plane is formed on a toroidal plane having a radius of curvature of 131 millimeters in a direction corresponding to the main-scanning direction and a radius of curvature of 18.6 millimeters in a direction corresponding to the sub-scanning direction.

$$\phi(Y, Z) = C1 \cdot Y^2 + C2 \cdot Z^2 \qquad (4)$$

The diffraction plane of the line-image forming lens 4 is a plane obtained by combining the first plane and the second plane, like the coupling lens 2, and set such that the power of the first plane and the power of the second plane are cancelled by each other in both of the main-scanning direction and the sub-scanning direction. Accordingly, the diffraction plane of the line-image forming lens 4 has no power both in the main-scanning direction and the sub-scanning direction. In the present embodiment, it is set such that scattered light, reflected light, and diffracted light of unnecessary order on the diffraction plane of the line-image forming lens 4 do not return to the vertical-cavity surface-emitting laser 1.

If the diffraction plane of the line-image forming lens 4 is a surface on the incident plane side of the line-image forming lens 4, the diffraction plane has a surface vertical to the optical axis. Therefore, the incident beams will cause strong reflection on the diffraction plane, and therefore there is the possibility that the reflected beams return to the vertical-cavity surface-emitting laser 1 to cause interference. Therefore, when the incident beams are substantially parallel beams, it is desired that the stepwise diffraction plane is designated as a surface on the emission plane side.

The diffraction plane of the line-image forming lens 4 has a function of correcting a change in the optical characteristics of the optical scanning device 900 due to a temperature change. For example, if a glass coupling lens, which does not have the diffraction plane, is used instead of the coupling lens 2, when the temperature changes by 20° C. from the standard temperature, a change in the beam waist position relative to the main-scanning direction was −0.01 millimeter, and a change in the beam waist position relative to the sub-scanning direction was 0.01 millimeter.

The optical system arranged on an optical path between the vertical-cavity surface-emitting laser 1 and the polygon mirror 5 is also referred to as an optical system before the deflecting unit. The optical system before the deflecting unit is arranged so that an imaging position is near the surface of the photoconductive drum 511. In the present embodiment, the optical system before the deflecting unit includes the coupling lens 2, the aperture 3, and the line-image forming lens 4.

The polygon mirror 5 has, as one example, four mirrors with a radius of inscribed circle being 7 millimeters, and rotates at uniform velocity around an axis parallel to the sub-scanning direction. The polygon mirror 5 is surrounded by a soundproof glass (not shown) having a thickness of 1.9 millimeters. As one example, the glass as the material of the soundproof glass has physical properties such as a refractive index of 1.511187 at the standard temperature (25° C.) relative to 780-nanometer beams, a refractive index of 1.511208 when the temperature rises by 20° C. from the standard temperature, and a coefficient of linear expansion of $7.5 \times 10^{-5}$/K.

Figure 7:
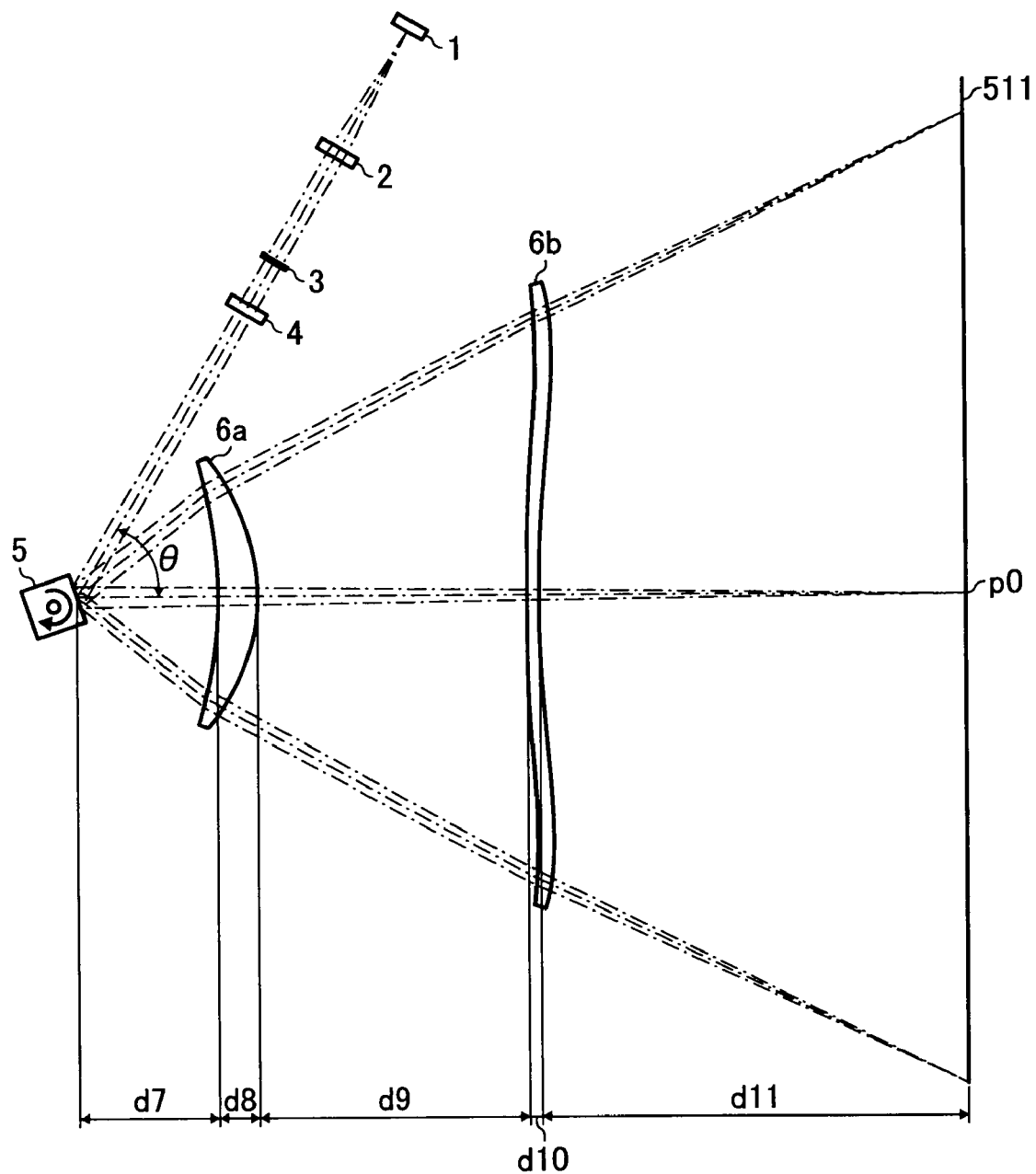
FIG. 7 is a schematic diagram for explaining positions of respective parts in the optical scanning device shown in FIG. 2.

As shown in Table 1 as one example, the scanning lens 6a has an incident plane having a paraxial radius of curvature in the main-scanning direction of −110.142 millimeters and a paraxial radius of curvature in the sub-scanning direction of −472.788 millimeters, and an emission plane having a paraxial radius of curvature in the main-scanning direction of −57.939 millimeters and a paraxial radius of curvature in the sub-scanning direction of −500 millimeters. The scanning lens 6a is a resin lens having a thick width of 8 millimeters at the center (on the optical axis) (d8 in FIG. 7). This resin has the same physical properties as those of the material of the coupling lens 2.

TABLE 1

|  | Incident plane | Emission plane |
| --- | --- | --- |
| Paraxial radius of curvature in main-scanning direction (mm) | −110.142 | −57.939 |
| Paraxial radius of curvature in sub-scanning direction (mm) | −472.788 | −500 |

As shown in Table 2 as one example, the scanning lens 6b has an incident plane having a paraxial radius of curvature in the main-scanning direction of −5000 millimeters and a paraxial radius of curvature in the sub-scanning direction of 93.8 millimeters, and an emission plane having a paraxial radius of curvature in the main-scanning direction of 724.16 millimeters and a paraxial radius of curvature in the sub-scanning direction of −60.71 millimeters. The scanning lens 6b is a resin lens having a thick width at the center (on the optical axis) (d10 in FIG. 7). This resin has the same physical properties as those of the material of the coupling lens 2.

TABLE 2

|  | Incident plane | Emission plane |
| --- | --- | --- |
| Paraxial radius of curvature in main-scanning direction (mm) | −5000 | 724.16 |
| Paraxial radius of curvature in sub-scanning direction (mm) | 93.8 | −60.71 |

Respective planes of the scanning lenses 6a and 6b are aspheric planes, and respectively have a noncircular shape shown by the following equation (5) in the main-scanning direction. A curvature of the both planes in a virtual section parallel to the optical axis and the sub-scanning direction (hereinafter, "sub-scanning section") changes in the main-scanning direction according to the following equation (6).

[Equation 3]

$$X = \frac{\frac{Y^2}{R_m}}{1 + \sqrt{1 - (1 + K_m) \cdot \left(\frac{Y}{R_m}\right)^2}} + A_1 Y + \qquad (5)$$

$$A_2 \cdot Y^2 + A_3 \cdot Y^3 + A_4 \cdot Y^4 + A_5 \cdot Y^5 + A_6 \cdot Y^6 \ldots$$

[Equation 4]

-continued $$Cs(Y) = \frac{1}{R_m} + B_1 \cdot Y + B_2 \cdot Y^2 + B_3 \cdot Y^3 + B_4 \cdot Y^4 + B_5 \cdot Y^5 + B_6 \cdot Y^6 \ldots \quad (6)$$

where X denotes a depth in a direction of the optical axis, $R_m$ denotes a paraxial radius of curvature in the main-scanning direction, Y denotes a distance in the main-scanning direction from the optical axis, K denotes a conic constant, $A_1, A_2, A_3, A_4, A_5, \ldots$ are coefficients, $R_s$ denotes a paraxial radius of curvature in the sub-scanning direction, and $B_1, B_2, B_3, \ldots$ are coefficients.

The conic constant and respective coefficients of the incident plane of the scanning lens 6a are shown in Table 3.

TABLE 3

| K | 0 | $B_1$ | 0 |
|---|---|---|---|
| $A_4$ | $-3.87482 \times 10^{-7}$ | $B_2$ | 0 |
| $A_6$ | $-6.88714 \times 10^{-10}$ | $B_3$ | 0 |
| $A_8$ | $-3.02912 \times 10^{-13}$ | $B_4$ | 0 |
| $A_{10}$ | $-1.381964 \times 10^{-16}$ | $B_5$ | 0 |
| $A_{12}$ | $4.973160 \times 10^{-20}$ | $B_6$ | 0 |
| | | $B_7$ | 0 |
| | | $B_8$ | 0 |

The conic constant and respective coefficients of the emission plane of the scanning lens 6a are shown in Table 4.

TABLE 4

| K | 0 | $B_1$ | $6.44465 \times 10^{-6}$ |
|---|---|---|---|
| $A_4$ | $1.46716 \times 10^{-7}$ | $B_2$ | $-2.76702 \times 10^{-6}$ |
| $A_6$ | $2.24364 \times 10^{-10}$ | $B_3$ | $-1.17939 \times 10^{-8}$ |
| $A_8$ | $-1.24578 \times 10^{-14}$ | $B_4$ | $-7.27004 \times 10^{-9}$ |
| $A_{10}$ | $5.54989 \times 10^{-18}$ | $B_5$ | $3.89316 \times 10^{-11}$ |
| $A_{12}$ | $-8.15818 \times 10^{-20}$ | $B_6$ | $-5.12653 \times 10^{-12}$ |
| | | $B_7$ | $-3.86625 \times 10^{-14}$ |
| | | $B_8$ | $1.12285 \times 10^{-14}$ |

The conic constant and respective coefficients of the incident plane of the scanning lens 6b are shown in Table 5.

TABLE 5

| K | 0 | $B_1$ | $4.98759 \times 10^{-7}$ |
|---|---|---|---|
| $A_4$ | $9.47700 \times 10^{-8}$ | $B_2$ | $-9.40784 \times 10^{-7}$ |
| $A_6$ | $-7.06270 \times 10^{-12}$ | $B_3$ | $5.11005 \times 10^{-11}$ |
| $A_8$ | $1.70056 \times 10^{-16}$ | $B_4$ | $7.50683 \times 10^{-11}$ |
| $A_{10}$ | $-6.11408 \times 10^{-20}$ | $B_5$ | $-5.15221 \times 10^{-15}$ |
| $A_{12}$ | $3.00776 \times 10^{-24}$ | $B_6$ | $-4.81012 \times 10^{-15}$ |
| | | $B_7$ | $-1.46189 \times 10^{-19}$ |
| | | $B_8$ | $7.21434 \times 10^{-19}$ |
| | | $B_9$ | $2.22208 \times 10^{-23}$ |
| | | $B_{10}$ | $-2.53749 \times 10^{-23}$ |

The conic constant and respective coefficients of the emission plane of the scanning lens 6b are shown in Table 6.

TABLE 6

| K | 0 | $B_1$ | 0 |
|---|---|---|---|
| $A_4$ | $-5.56255 \times 10^{-8}$ | $B_2$ | $2.9875 \times 10^{-7}$ |
| $A_6$ | $5.42541 \times 10^{-12}$ | $B_3$ | 0 |
| $A_8$ | $-6.15064 \times 10^{-16}$ | $B_4$ | 0 |
| $A_{10}$ | $-2.44542 \times 10^{-20}$ | $B_5$ | 0 |
| $A_{12}$ | $1.76451 \times 10^{-24}$ | $B_6$ | 0 |
| | | $B_7$ | 0 |
| | | $B_8$ | 0 |

As one example, the distance (d7 in FIG. 7) between the polygon mirror 5 and the incident plane of the scanning lens 6a is 43.3 millimeters, the distance (d9 in FIG. 7) between the emission plane of the scanning lens 6a and the incident plane of the scanning lens 6b is 101.1 millimeters, the distance (d11 in FIG. 7) between the emission plane of the scanning lens 6b and the surface of the photoconductive drum 511, which is a scanning surface, is 139.9 millimeters.

An angle (θ in FIG. 7) formed by a traveling direction of the beams incident to the deflection reflecting surface of the polygon mirror 5 from the vertical-cavity surface-emitting laser 1 side and a traveling direction of the beams reflected by the deflection reflecting surface of the polygon mirror 5 toward a position of image height 0 (a position denoted by sign p0 in FIG. 7) on the surface of the photoconductive drum 511 is 59 degrees.

The folding mirror 7 folds the optical path of the beams via the scanning lens 6b toward the surface of the photoconductive drum 511. Accordingly, a beam spot is formed on the surface of the photoconductive drum 511. The beam spot moves in the main-scanning direction with the rotation of the polygon mirror 5. That is, the beam spot scans on the photoconductive drum 511.

The optical system arranged on the optical path between the polygon mirror 5 and the photoconductive drum 511 is also referred to as a scanning optical system. In the present embodiment, the scanning optical system includes the scanning lens 6a, the scanning lens 6b, and the folding mirror 7. A dustproof glass (not shown) having a thickness of 1.9 millimeters is arranged between the folding mirror 7 and the photoconductive drum 511. The dustproof glass is made of glass having the same physical property as that of the soundproof glass.

A part of the beams passing through the scanning lens 6a toward outside of an effective scanning area is received by the synchronization detector (synchronization sensor) 11 via the synchronizing mirror 9 and the synchronizing lens 10. The synchronization detector 11 outputs a signal corresponding to the received light amount (photoelectric conversion signal). Timing to start scanning is determined based on the output of the synchronization detector 11.

In the laser printer 500 according to the present embodiment, a change in the beam waist position relative to the main-scanning direction when the temperature changed by 20° C. from the standard temperature was 0.03 millimeter, and a change thereof relative to the sub-scanning direction was 0.00 millimeter. When a resin coupling lens having no diffraction plane was used instead of the coupling lens 2, as one example, a change in the beam waist position relative to the main-scanning direction when the temperature changed by 20° C. from the standard temperature was 15.93 millimeters, and a change thereof relative to the sub-scanning direction was −2.27 millimeters. In other words, the coupling lens 2 can remarkably reduce the change in the beam waist position both in the main and sub-scanning directions.

As explained above, the optical scanning device 900 according to the present embodiment includes the coupling lens 2 having the refraction plane and the diffraction plane, whose powers respectively change corresponding to a temperature change, so that the change in the beam waist position in the main and sub-scanning directions on the scanning surface due to the temperature change can be suppressed by a wavelength change of the beams from the laser 1 resulting from the power change of the refraction plane and the diffraction plane and the temperature change. Because the coupling lens 2 emits the beams from the vertical-cavity surface-emitting laser 1 toward the polygon mirror 5 as substantially parallel beams, the focal length of the coupling lens 2 can be set without relying on the optical characteristics of the scanning optical system. Further, the shape of the diffraction plane of the coupling lens 2 is not for correcting a change in the optical characteristics of the whole optical scanning device due to a temperature change, but for correcting only a change in the optical characteristics of the coupling lens itself. Therefore, generality is improved and stable optical scanning becomes possible without causing cost increase.

Generally, the change in the optical characteristics of the coupling lens considerably affects the optical performance of the optical scanning device. When the coupling lens is resinified, the influence thereof further increases. As in the present embodiment, therefore, even if the coupling lens corrects only the change in the optical characteristics of the coupling lens itself, the correction largely contributes to stabilization of the optical scanning device.

A divergence angle of the beams emitted from the vertical-cavity surface-emitting laser is small. Further, to reduce a magnification relative to the main-scanning direction, the focal length of the coupling lens needs to be long. Therefore, a correction effect of the beam waist position relative to the temperature change by "elongation (so-called lens barrel elongation)" of a holding member that holds the vertical-cavity surface-emitting laser and the coupling lens is small. Therefore, it is desired to set the coupling lens sensitive to the wavelength change (overcorrection). Because the beams emitted from the vertical-cavity surface-emitting laser have little wavelength shift (wavelength transition), it is desired to design the coupling lens, preferentially taking a temperature change into consideration, rather than the wavelength change. The effect of the diffraction plane of the coupling lens is obtained by using the characteristics thereof. On the other hand, there is the possibility that undesired wavelength change can cause deterioration of the optical performance. However, when the vertical-cavity surface-emitting laser is used as the light source, mode hop does not occur fundamentally, which is different from the end-face emitting semiconductor lasers. Therefore, degradation of the optical characteristics due to undesired wavelength change can be avoided.

According to the optical scanning device 900 in the present embodiment, in the coupling lens 2, it is set such that a power change of the refraction plane per unit wavelength becomes smaller than that of the diffraction plane per unit wavelength.

To obtain high definition in the image quality, the beam spot diameter on the surface of the photoconductive drum needs to be small. Generally, because the vertical-cavity surface-emitting laser has a smaller divergence angle of the beams than that of the end-face emitting semiconductor laser, it is necessary to design such that the focal length of the coupling lens is longer than that in the end-face emitting semiconductor laser. If the focal length of the coupling lens is long, the power of the diffraction plane for correcting a change in the optical characteristics of the coupling lens itself can be small. Therefore, even a vertical-cavity surface-emitting laser having a small wavelength change can perform sufficient correction. Accordingly, application of the vertical-cavity surface-emitting laser can exhibit a strong effect in stabilizing the optical scanning device, together with introduction of the diffraction plane into the coupling lens.

According to the optical scanning device 900 in the present embodiment, the power of the first plane and the power of the second plane in the coupling lens 2 are cancelled by each other. Accordingly, a folded part of the diffraction plane becomes an obtuse angle, thereby facilitating the production of the mold for forming the diffraction plane.

According to the optical scanning device 900 in the present embodiment, the shape of the diffraction plane of the coupling lens 2 is a multi-step shape. Accordingly, the folded part of the diffraction plane becomes a right angle, which is a stepwise shape symmetrical to the optical axis, thereby further improving the production of the mold for forming the diffraction plane. In this case, 0-th order light and diffracted light of 1st order light and after are directed to the same direction, it has, optically, an equal value as that of the non-power plane, and therefore degradation of the optical characteristics relative to decentering can be suppressed.

According to the optical scanning device 900 in the present embodiment, because the vertical-cavity surface-emitting laser 1 has a plurality of light emitting parts, a plurality of scanning becomes possible simultaneously. Accordingly, stable and high-density optical scanning can be performed without causing cost increase.

According to the present embodiment, a highly stable optical scanning device can be realized, while reducing its number of parts. Accordingly, the amount of use of the materials related to the production of the optical scanning device can be reduced. As a result, environmental load related to mining of resources and discharge of plastic waste can be reduced.

According to the laser printer 500 in the present embodiment, because it includes the optical scanning device 900 that can perform stable optical scanning without causing cost increase, high quality images can be formed stably without causing cost increase.

Figure 8A:
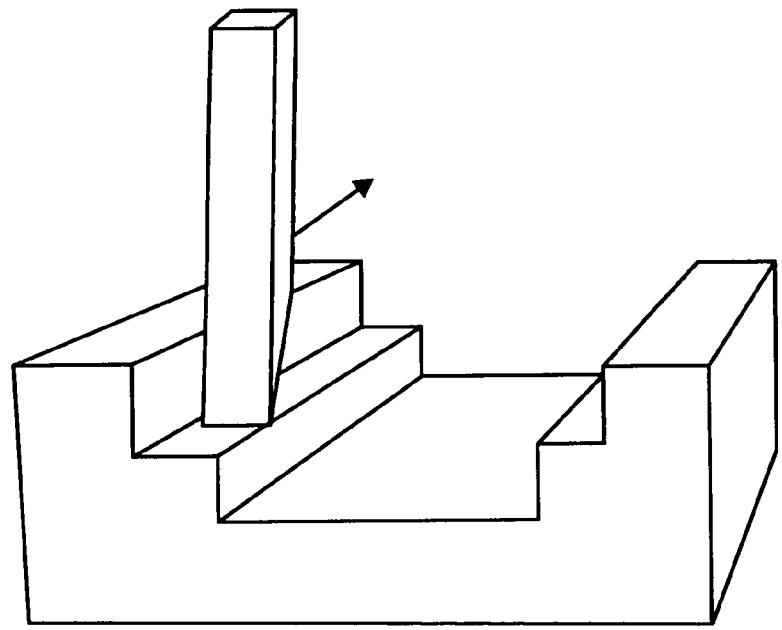
FIG. 8A and FIG. 8B are schematic diagrams for explaining a manufacturing method of a mold for forming the diffraction plane.
Figure 8B:
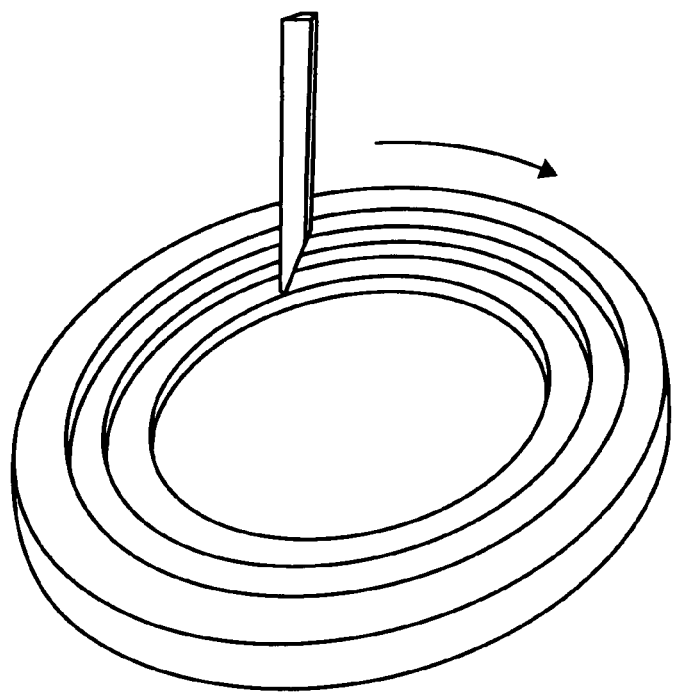

According to the present embodiment, a case that the diffractive grooves on the diffraction plane of the coupling lens 2 are concentric circular has been explained. However, the present invention is not limited thereto, and grooves parallel to at least one of a direction corresponding to the main-scanning direction and a direction corresponding to the sub-scanning direction can be formed on the diffraction plane of the coupling lens 2. When the diffraction plane is formed of a resin, a forming mold having a shape of irregularity opposite to that of the diffraction plane formed thereon by cutting (hereinafter, "transfer shape" for convenience) is used. When the shape of the diffraction plane is linear grooves, the transfer shape can be formed on the mold only by running a cutting tool in one direction, and there is no problem when the cutting tool is released. If the shape of the diffraction plane is concentric elliptic grooves, labor for setting a shaft is required and it is necessary to consider a method of releasing the cutting tool. When the shape of the diffraction plane is stepwise symmetrical to the optical axis, an angle for applying the cutting tool becomes substantially right angle, and therefore convenience in producing the mold is further improved (see FIGS. 8A and 8B).

According to the present embodiment, a case that the line-image forming lens 4 has the diffraction plane has been explained. However, when the required correction is achieved by the coupling lens 2, the line-image forming lens 4 having no diffraction plane can be used, instead of the line-image forming lens 4.

Figure 9:
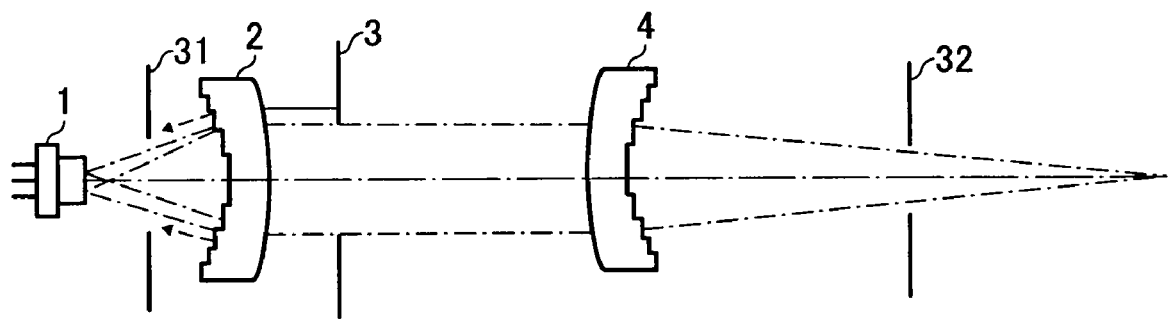
FIG. 9 is a schematic diagram for explaining a plurality of opening members.

When influences of the diffracted light of unnecessary order and scattered light on the diffraction plane cannot be ignored, an opening member for shielding unnecessary beams can be provided in the optical system before the deflecting unit. For example, as shown in FIG. 9, an opening member 31 can be provided on the optical path between the vertical-cavity surface-emitting laser 1 and the coupling lens 2, and an opening member 32 can be provided on the optical path between the line-image forming lens 4 and the polygon mirror 5. In this case, if the widths of each opening member in the directions corresponding to the main and sub-scanning directions are set smaller than the widths of the aperture 3 in the directions corresponding to the main and sub-scanning directions, the diffracted light of unnecessary order and the scattered light can be removed efficiently. It can also be considered to arrange the aperture 3 at a position where the width of the beams becomes narrow. However, if the aperture 3 is arranged at the position where the width of the beams becomes narrow, there is a problem in that a variation amount of the beam spot diameter on the photoconductive drum 511 due to a processing error (a metrication error) of the opening of the aperture 3 increases.

According to the present embodiment, the case that there are two scanning lenses in the scanning optical system has been explained. However, the present invention is not limited thereto, and the scanning lens of the scanning optical system can be only one, or three or more.

According to the present embodiment, the case that the vertical-cavity surface-emitting laser 1 has a plurality of light emitting units has been explained. However, if it is not necessary to scan a plurality of surfaces simultaneously, a vertical-cavity surface-emitting laser having only one light emitting unit can be used instead of the vertical-cavity surface-emitting laser 1.

According to the present embodiment, the case of a direct transfer method, in which transfer of a toner image from the photoconductive drum 511 onto the transfer paper is directly performed from the photoconductive drum 511 to the transfer paper, has been explained. However, the transfer can be performed by an intermediate transfer method, in which a toner image is once transferred from the photoconductive drum 511 onto an intermediate transfer medium such as an intermediate transfer belt, and then the image is transferred from the intermediate transfer medium to the transfer paper.

According to the present embodiment, the case that the image carrier has a drum-like shape has been explained. However, the present invention is not limited thereto, and the image carrier can be a sheet-like shape or a belt-like shape. For example, zinc oxide paper can be used as the sheet-like photoconductive photoconductor.

According to the present embodiment, the case that the laser printer 500 is used as the image forming apparatus has been described. However, the present invention is not limited thereto, and for example, an optical plotter or a digital copying machine can be used.

Further, the image forming apparatus can use a silver salt film as the image carrier. In this case, a latent image is formed on the silver salt film by optical scanning, and the latent image can be visualized by an equivalent process to a developing process in a general silver-salt photographic process. Further, the latent image can be transferred to a printing paper as a transfer object by an equivalent process to a printing process in the general silver-salt photographic process. Such an image forming apparatus can be implemented as an optical process machine or an optical drawing apparatus that draws a computerized tomography (CT) scan image or the like.

The image forming apparatus can use a color development medium (positive printing paper) that develops color due to thermal energy of the beam spot as the image carrier. In this case, a visual image can be directly formed on the image carrier by optical scanning.

In short, an image forming apparatus including the optical scanning device 900 can form high quality images stably, without increasing the cost.

Even in an image forming apparatus for forming color images, by using the optical scanning device corresponding to color image, high quality images can be formed stably, without increasing the cost.

Figure 10:
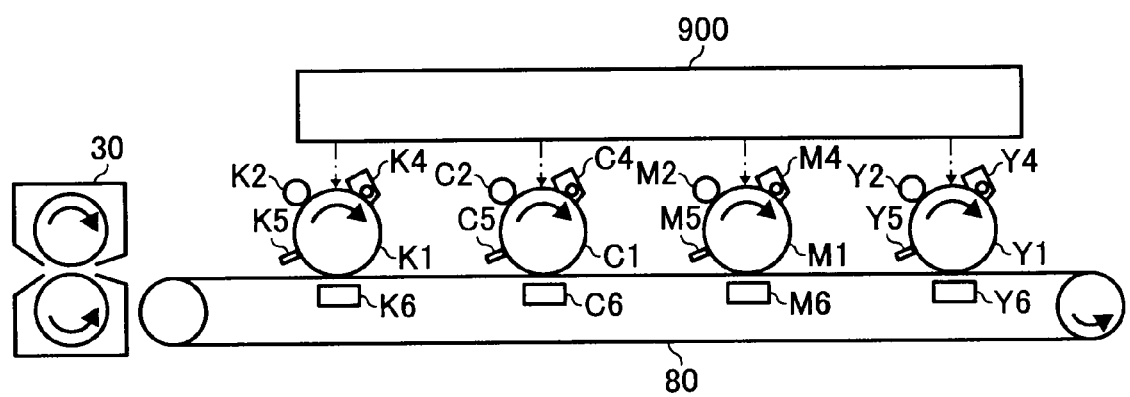
FIG. 10 is a schematic diagram for explaining a schematic configuration of a tandem color copying machine.

As shown in FIG. 10 as one example, a tandem color copying machine including a plurality of photoconductive drums corresponding to a color image can be used as the image forming apparatus. The tandem color copying machine shown in FIG. 10 includes a photoconductive drum K1, a charger K2, a developing unit K4, a cleaning unit K5, and a transfer charger K6 for black, a photoconductive drum C1, a charger C2, a developing unit C4, a cleaning unit C5, and a transfer charger C6 for cyan, a photoconductive drum M1, a charger M2, a developing unit M4, a cleaning unit M5, and a transfer charger M6 for magenta, a photoconductive drum Y1, a charger Y2, a developing unit Y4, a cleaning unit Y5, and a transfer charger Y6 for yellow, an optical scanning device 900, a transfer belt 80, and a fuser 30.

In this case, in the optical scanning device 900, the light emitting units in the vertical-cavity surface-emitting laser 1 are divided into units for black, cyan, magenta, and yellow. The beams from respective light emitting units for black are irradiated onto the photoconductive drum K1, the beams from respective light emitting units for cyan are irradiated onto the photoconductive drum C1, the beams from respective light emitting units for magenta are irradiated onto the photoconductive drum M1, and the beams from respective light emitting units for yellow are irradiated onto the photoconductive drum Y1.

Respective photoconductive drums rotate in a direction of arrow in FIG. 10, and the charger, the developing unit, the transfer charger, and the cleaning unit are arranged in order of rotation. Respective chargers uniformly charge the surface of the corresponding photoconductive drum. Beams are irradiated onto the surfaces of the photoconductive drums charged by the respective chargers by the optical scanning device 900, thereby forming an electrostatic latent image on the photoconductive drums. A toner image is then formed on the respective photoconductive drums by the corresponding developing unit. Respective color toner images are transferred onto recording paper by the corresponding transfer charger, and an image is finally fixed on the recording paper by the fuser 30. That is, respective color toner images are transferred and fixed on the same sheet-like recording medium, thereby obtaining a color image and a multicolor image synthetically.

In this tandem color copying machine, the optical scanning device 900 can include the vertical-cavity surface-emitting laser 1 for each color.

For example, when the optical scanning device 900 includes a black vertical-cavity surface-emitting laser (hereinafter, "light source K"), a cyan vertical-cavity surface-emitting laser (hereinafter, "light source C"), a magenta vertical-cavity surface-emitting laser (hereinafter, "light source M"), and a yellow vertical-cavity surface-emitting laser (hereinafter, "light source Y"), the polygon mirror can be used commonly between respective colors. Accordingly, the number of polygon mirrors, which is relatively expensive, decreases, thereby cost reduction can be easily achieved. Because the polygon mirror is the largest heat generation source in the optical scanning device, a temperature rise in the optical scanning device can be suppressed by a decrease in the number of the polygon mirrors. By suppressing the temperature rise in the optical scanning device, an undesired mode hop in the vertical-cavity surface-emitting laser can be reduced. In this case, as the configuration of the optical scanning device, there are a method in which respective color beams are incident to a sub-scanning section including the rotation shaft of the polygon mirror substantially symmetrically (so-called "opposing scanning method") and a method in which the respective color beams are deflected by the same reflecting surface of the polygon mirror (so-called "one-side scanning method").

Figure 11:
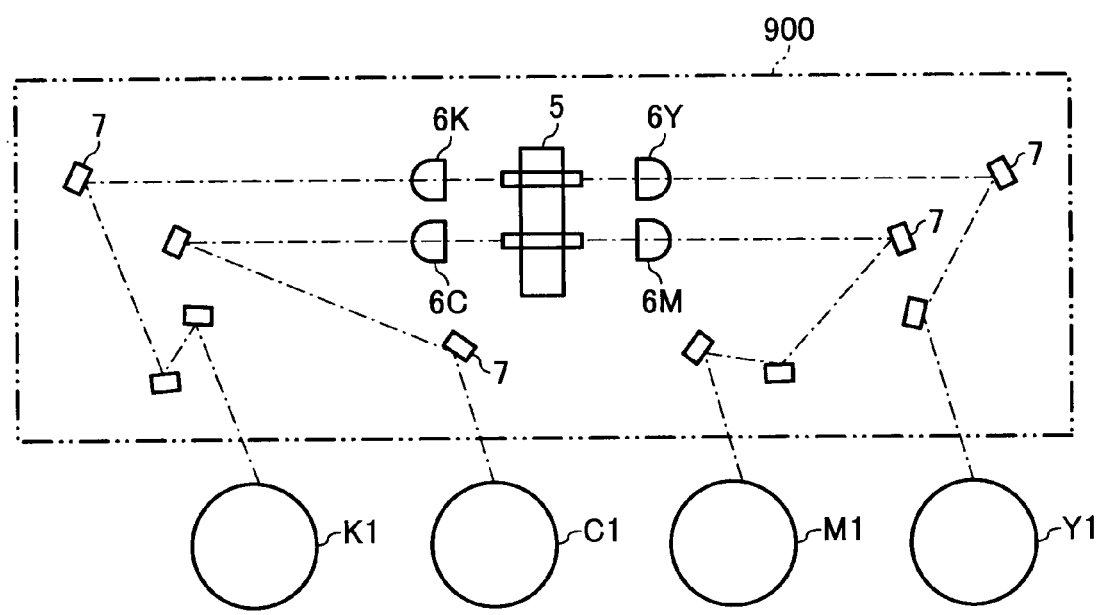
FIG. 11 is a schematic diagram for explaining configuration example 1 of the optical scanning device in FIG. 10.

A configuration example of the opposing scanning method using the polygon mirror 5 having two-stage deflection reflecting surfaces is shown in FIG. 11. Beams from the light sources K and Y are deflected by the upper deflection reflecting surface, and beams from the light sources C and M are deflected by the lower deflection reflecting surface. Reference character 6K in FIG. 11 is a black scanning lens, 6C is a cyan scanning lens, 6M is a magenta scanning lens, and 6Y is a yellow scanning lens.

Figure 12:
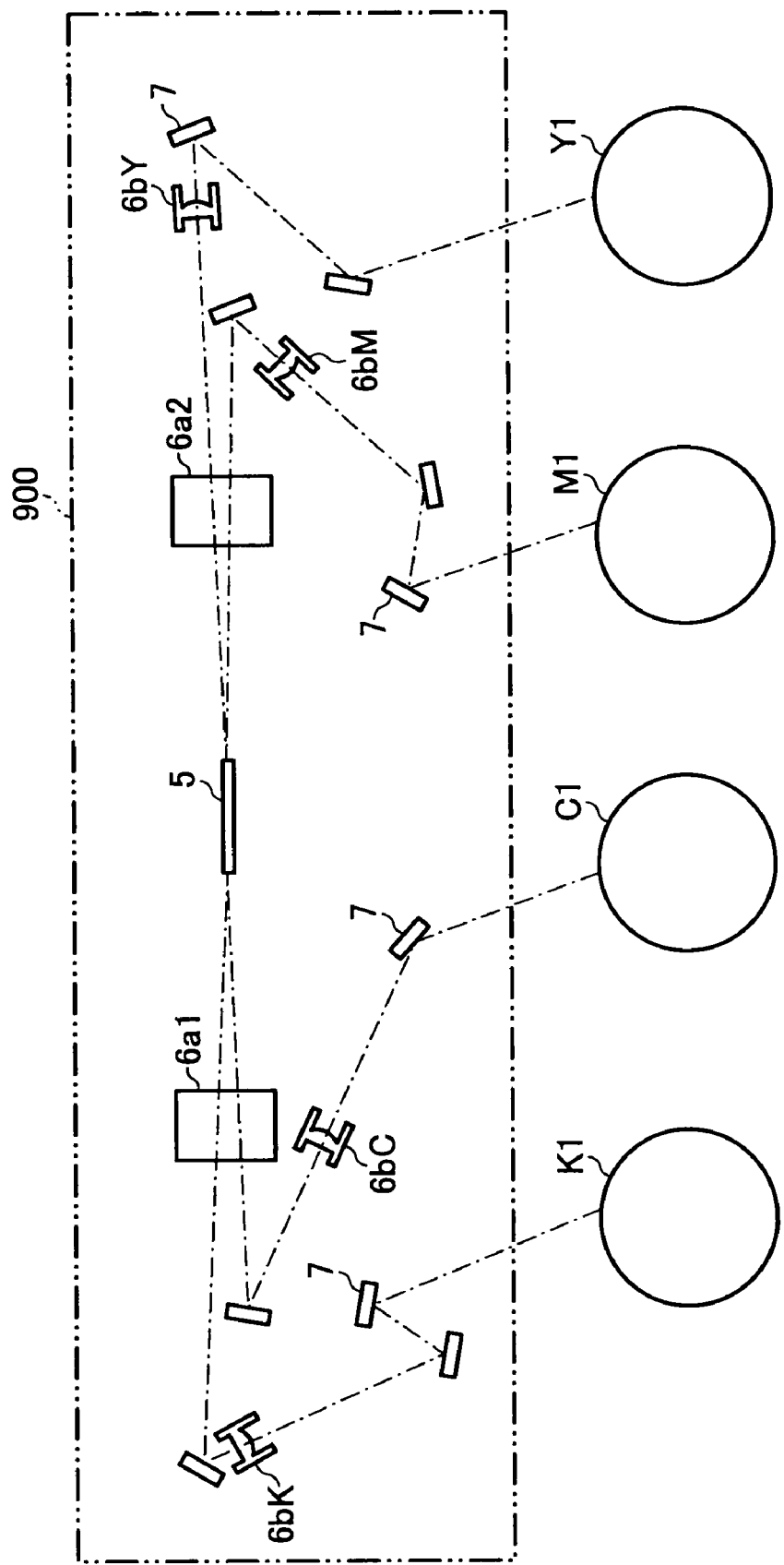
FIG. 12 is a schematic diagram for explaining configuration example 2 of the optical scanning device in FIG. 10.

The scanning method explained above is not limited to a mode in which the beams from the light source are incident to a normal of the deflection reflecting surface of the polygon mirror in parallel. The beams from the light source can enter to the normal of the deflection reflecting surface of the polygon mirror with an angle. In this specification, this method is referred to as an "oblique-incidence method". A configuration example of the oblique-incidence method in the opposing scanning method is shown in FIG. 12. The beams from the light source K are deflected by the polygon mirror 5, and condensed on the photoconductive drum K1 via the scanning lenses 6a1 and 6bK. The beams from the light source C are deflected by the polygon mirror 5, and condensed on the photoconductive drum C1 via the scanning lenses 6a1 and 6bC. The beams from the light source M are deflected by the polygon mirror 5, and condensed on the photoconductive drum M1 via the scanning lenses 6a2 and 6bM. The beams from the light source Y are deflected by the polygon mirror 5, and condensed on the photoconductive drum Y1 via the scanning lenses 6a2 and 6bY. An advantage of the oblique-incidence method is that beams from four light sources can be deflected by a polygon mirror having one-stage deflecting reflecting surface, thereby enabling further cost reduction. However, when the oblique-incidence method is employed, a scanning line curvature and deterioration of wave front aberration occur. Therefore, a scanning lens corresponding to the oblique-incidence method needs to be used.

Further, in the tandem color copying machine, the optical scanning device 900 can be provided for each color.

As described above, according to one aspect of the present invention, the coupling lens emits beams from the vertical-cavity surface-emitting laser toward the deflecting unit as substantially parallel beams. Therefore, the focal length of the coupling lens can be set without relying on the optical characteristics of the scanning optical system. Further, the shape of the diffraction plane of the coupling lens is not for correcting a change in the optical characteristics of the whole optical scanning device due to a temperature change, but for correcting only a change in the optical characteristics of the coupling lens itself. Therefore, generality is improved, and stable optical scanning becomes possible without causing cost increase.

Furthermore, according to another aspect of the present invention, high quality images can be formed stably without causing cost increase.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An optical scanning device that scans a scanning surface using an optical beam, the optical scanning device comprising:

a vertical-cavity surface-emitting laser that emits the optical beam;

a coupling lens arranged on an optical path of the optical beam from the vertical-cavity surface-emitting laser, the coupling lens having a refraction plane and a diffraction plane that respectively change a power according to a temperature change and suppressing a beam-waist position change in a main-scanning direction and a sub-scanning directions on the scanning surface caused by the temperature change, by a wavelength change of the optical beam caused by power changes of the refraction plane and the diffraction plane and the temperature change;

a deflecting unit that deflects the optical beam that passed through the coupling lens; and a scanning optical system that condenses a deflected optical beam on the scanning surface.

2. The optical scanning device according to claim 1, wherein the coupling lens has a power change on the refraction plane per unit wavelength smaller than a power change on the diffraction plane per unit wavelength.

3. The optical scanning device according to claim 2, wherein
the diffraction plane of the coupling lens is a plane obtained by combining a first plane having a diffraction effect with a second plane having a refraction effect, and
a power of the first plane and a power of the second plane are cancelled by each other.

4. The optical scanning device according to claim 3, wherein the diffraction plane of the coupling lens has a multi-stepped shape.

5. The optical scanning device according to claim 1, wherein a parallel groove is formed in at least one of a direction corresponding to the main-scanning direction and a direction corresponding to the sub-scanning direction on the diffraction plane of the coupling lens.

6. The optical scanning device according to claim 1, wherein the vertical-cavity surface-emitting laser includes a plurality of light emitting elements.

7. The optical scanning device according to claim 1, further comprising:
an opening on each optical path between the vertical-cavity surface-emitting laser and the deflecting unit; and
a plurality of opening members that shields an unnecessary optical beam.

8. The optical scanning device according to claim 7, wherein
each of the opening members includes an aperture for regulating a beam spot size on the scanning surface, and
a width of each opening in a direction corresponding to the main-scanning direction and a width of each opening in a direction corresponding to the sub-scanning direction in the opening members are set in such a manner that the opening in the aperture is the largest.

9. The optical scanning device according to claim 1, wherein the coupling lens is a resin lens.

10. An image forming apparatus comprising:
at least one image carrier; and
an optical scanning device that scans a scanning surface using an optical beam, the optical scanning device including
a vertical-cavity surface-emitting laser that emits the optical beam,
a coupling lens arranged on an optical path of the optical beam from the vertical-cavity surface-emitting laser, the coupling lens having a refraction plane and a diffraction plane that respectively change a power according to a temperature change and suppressing a beam-waist position change in a main-scanning direction and a sub-scanning directions on the scanning surface caused by the temperature change, by a wavelength change of the optical beam caused by power changes of the refraction plane and the diffraction plane and the temperature change;

a deflecting unit that deflects the optical beam that passed through the coupling lens; and a scanning optical system that condenses a deflected optical beam on the scanning surface, wherein the scanning optical system scans the optical beam including image information to the at least one image carrier.

11. The image forming apparatus according to claim 10, wherein the image information is color image information.

* * * * *